United States Patent [19]

Morris et al.

[11] Patent Number: 4,850,435
[45] Date of Patent: Jul. 25, 1989

[54] CULTIVATOR SWEEP WITH PAIR OF REARWARDLY EXTENDING DOWNTURNED RIGID FLAPS

[75] Inventors: George H. Morris; Donald M. Michalchuk, both of Yorkton; Lyle Harper, Togo, all of Canada

[73] Assignee: Morris Rob-Weeder Company, Ltd., Yorkton, Canada

[21] Appl. No.: 18,274

[22] Filed: Feb. 24, 1987

[51] Int. Cl.⁴ .............................................. A01B 39/20
[52] U.S. Cl. .................... 172/730; 172/732; 172/770
[58] Field of Search ............... 172/720, 721, 724, 725, 172/726, 730, 732, 770, 771

[56] References Cited

U.S. PATENT DOCUMENTS

| | | | |
|---|---|---|---|
| 186,803 | 1/1877 | Conaway | 172/719 |
| 925,362 | 6/1909 | Lucier | 172/661 |
| 976,518 | 11/1910 | Stanza | 172/721 |
| 983,629 | 2/1911 | Lundell | 172/697 |
| 1,549,633 | 8/1925 | Uzemack | 172/192 |
| 1,633,388 | 6/1927 | Silver | 111/52 |
| 2,333,371 | 11/1943 | Graham | 111/80 |
| 2,351,388 | 6/1944 | Baxter | 172/720 |
| 2,889,788 | 6/1959 | Van Dorn | 111/80 |
| 3,152,649 | 10/1964 | Arnold | 172/730 |
| 3,326,152 | 5/1967 | Frantzen | 111/7 |
| 4,269,274 | 5/1981 | Robertson et al. | 172/699 |
| 4,333,536 | 6/1982 | Ryan | 172/721 |
| 4,363,364 | 12/1982 | Wetmore | 172/732 |
| 4,415,042 | 11/1983 | Cosson | 172/749 |
| 4,580,639 | 4/1986 | Johnson | 172/730 |

FOREIGN PATENT DOCUMENTS

| | | | |
|---|---|---|---|
| 19363 | 3/1930 | Australia | 172/730 |
| 189406 | 4/1919 | Canada . | |
| 236091 | 12/1923 | Canada . | |
| 263879 | 8/1929 | Canada . | |
| 390091 | 7/1940 | Canada . | |
| 505252 | 8/1954 | Canada . | |
| 537666 | 3/1957 | Canada . | |
| 546186 | 9/1957 | Canada . | |
| 794618 | 9/1968 | Canada . | |
| 1096686 | 3/1981 | Canada . | |
| 1123256 | 5/1982 | Canada . | |
| 1125563 | 6/1982 | Canada . | |
| 1131977 | 9/1982 | Canada . | |
| 1143209 | 3/1983 | Canada . | |
| 1163492 | 3/1984 | Canada . | |
| 1173876 | 9/1984 | Canada . | |
| 1181980 | 2/1985 | Canada . | |
| 1183039 | 2/1985 | Canada . | |

*Primary Examiner*—Richard T. Stouffer
*Attorney, Agent, or Firm*—Hovey, Williams, Timmons & Collins

[57] ABSTRACT

The convex upper surface of the generally triangular sweep has oppositely inclined, lateral faces that diverge from the forwardmost point of the sweep and serve to loosen and lift the soil while the outer cutting edges sever subsurface roots of weeds and other above-ground growth. Rigid, rearwardly extending flaps at the rear extremity of the sweep are disposed at such a strategic angle that although they rigidify the trailing section of the sweep and reduce wear which might otherwise occur at outer rear corners of the sweep, they avoid untoward turning and rolling of the loosened soil and severed plant materials so that moisture-retaining trash and plant residue is left intact on the ground surface.

6 Claims, 2 Drawing Sheets

CULTIVATOR SWEEP WITH PAIR OF REARWARDLY EXTENDING DOWNTURNED RIGID FLAPS

FIELD OF THE INVENTION

The present invention generally relates to a cultivator sweep and, more particularly, is concerned with a wear-resistant sweep minimizing soil disturbance as it works through the soil.

BACKGROUND OF THE INVENTION

In order to optimize crop yield it is generally necessary prior to planting to till the soil and kill weeds which would otherwise rob the soil of valuable moisture and nutrients. Many presently available farm implements utilize some from of generally V-shaped or arrow-shaped sweep which is drawn through the ground beneath the surface cutting the roots of weeds that are in its path of travel.

The prior arrow-shaped cultivating sweeps have a forwardmost ground penetrating point and a pair of wings which diverge outwardly and rearwardly from the point. The wings have outermost cutting edges which cut the weed roots as the sweep moves through the ground. The wings are typically unsupported at their ends and have a tendency to throw and roll the dirt so as to form a ridge of dirt and bury the surface plant material as the sweep is worked through the ground.

The cited prior practice has a number of problems or shortcomings. The ridges left by the arrow-shaped sweeps create a rough weed bed which makes proper seeding somewhat difficult. Furthermore, the tendency of the sweeps to throw and roll dirt and thereby cover up the surface plant materials increases the likelihood and severity of water and wind erosion and furthermore decreases the amount of surface plant material that is available to trap snow, resulting in a decreased amount of snow melt and a corresponding decrease in the amount of moisutre available for the crop in the Spring. The tendency of the prior arrow-shaped sweeps to throw and roll the dirt creates a substantial drag on the sweep and results in a corresponding power consumption requirement for the farm implement which pulls the sweep through the ground. The unsupported ends of the wings tend to experience excessive wear and deformation as the wings encounter rocks in the ground, and as the wings wear, their effective width and correspondingly their effective cutting ability decreases.

Consequently, a need exists for improvements in cultivator sweeps which will result in decreased soil disturbance and increased wing strength.

SUMMARY OF THE INVENTION

Accordingly, the present invention provides a cultivator sweep designed to satisfy the aforementioned needs and to overcome the aforementioned shortcomings of the prior practice. The formed metal sweep of the present invention has a generally triangular head and a pair of laterally spaced apart, strategically downturned and positioned, rigid reinforcing flaps extending rearwardly from the rear extremity of the head. The special attitude of the flaps causes them to reinforce the rear extremity of the head and make it more wearresistant, yet at the same time allow the lifted soil to lay back down without being thrown or rolled, thereby allowing the sweep to move through the ground with a minimum of soil disturbance. Due to the minimum disturbance of the ground, the worked ground is left with a relatively smooth seed bed which facilitates the later planting of seeds. Furthermore, a minimum of surface plant material is buried so as to maximize the amount of snow trapped on the field surface and also so as to minimize water and wind erosion of the field. The minimum disturbance of the soil results in a corresponding reduction in the drag on the sweep which should result in a corresponding decrease in the power consumption of the implement.

DETAILED DESCRIPTION

Figure 1:
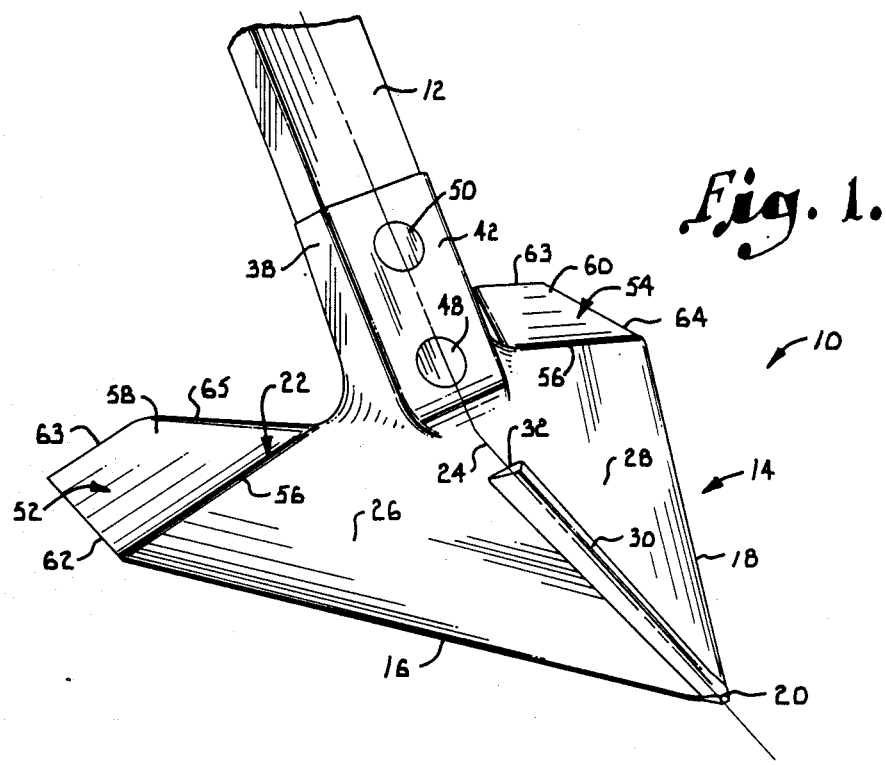
FIG. 1 is a right, front perspective view of a cultivator sweep incorporating the principles of the present invention being shown attached to a shank of a farm implement.

A forged metal cultivator sweep 10, as shown in FIG. 1, is adapted for attachment to a shank 12 of a ground working, tillage implement (not shown) for being drawn forwardly through the ground by the implement.

The sweep 10 is a concave/convex unitary body of substantially uniform thickness and has a generally triangular head 14 provided with a pair of opposite side cutting edges 16,18 diverging rearwardly from a forwardmost ground penetrating point 20. The outermost extremes of head 14 are beveled so that they taper outwardly to the relatively thin side edges 16,18 for enhanced cutting ability. A rear extremity 22 of the head 14 extends transversely between the rearmost ends of the side edges 16,18.

A central, fore-and-aft line of symmetry 24 for the head 14 extends rearwardly from the point 20, and a pair of opposite, inclined, generally triangular faces 26,28 of the head 14 extend downwardly and outwardly in opposite directions from the line of symmetry 24 to the side edges 16,18. A prism-shaped reinforcing ridge 30 extends upwardly and rearwardly from the forwardmost point 20 along the symmetry line 24. The ridge 30 has a rearmost end 32 which is located just forward of base 34 of integral bracket 36.

The centrally located mounting bracket 36 projects upwardly and rearwardly from the rear extremity 22 of head 14 and serves to attach the sweep 10 to the supporting structural shank 12 of the implement. The bracket 36 is somewhat channel shaped, having a pair of laterally spaced apart sidewalls 38,40 extending rearwardly from a transverse front wall 42 for engaging the sides of shank 12 thereby resisting lateral movement of the sweep 10 relative to the shank 12. The front wall 42 is disposed for overlying and engaging the front side of the shank 12 and has a pair of bolt holes 44,46 for receiving bolts 48,50 for securing the bracket 36 of the sweep 10 to the shank 12.

The sweep 10 is also provided with a pair of special, rearwardly projecting, rigid flaps 52,54 located on opposite sides of the bracket 36 and integral with the rear extremity 22 of head 14. Rear extremity 22 serves to define a transverse breakline 56 at which the faces 26,28 of the head 14 intersect with the flaps 52,54.

The flaps 52,54 are downturned at the breakline 56 relative to the faces 26,28 and have respective uppermost, downwardly and outwardly inclined surfaces 58,60 so disposed that all points on the flaps 52,54 are no higher than corresponding, forwardly aligned points on the transverse breakline 56. Preferably, the flaps are bent down rearwardly at a 16° slope relative to the faces 26,28 along the transverse breakline 56.

Figure 3:
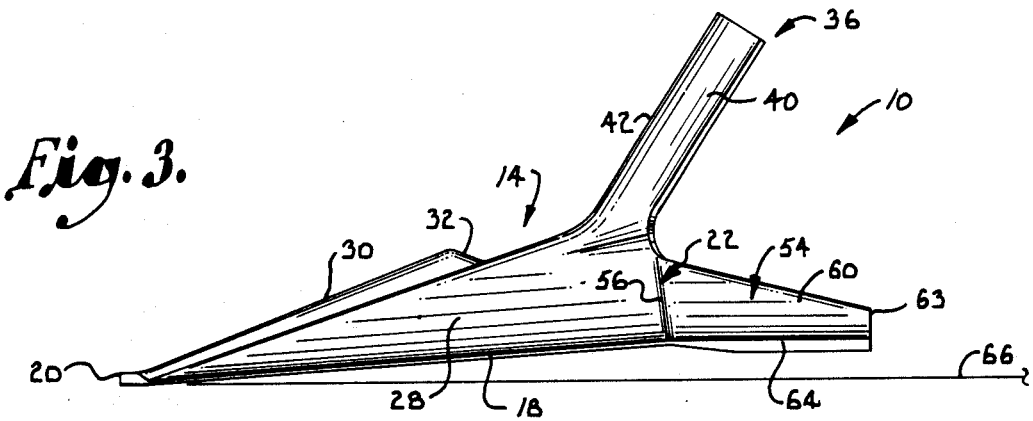
FIG. 3 is a left, side elevational view of the sweep.
Figure 4:
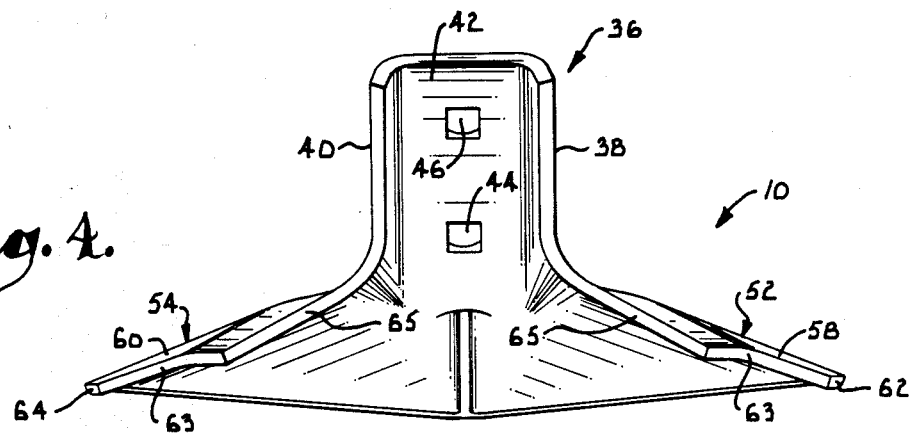
FIG. 4 is a rear elevational view of the sweep.
Figure 5:
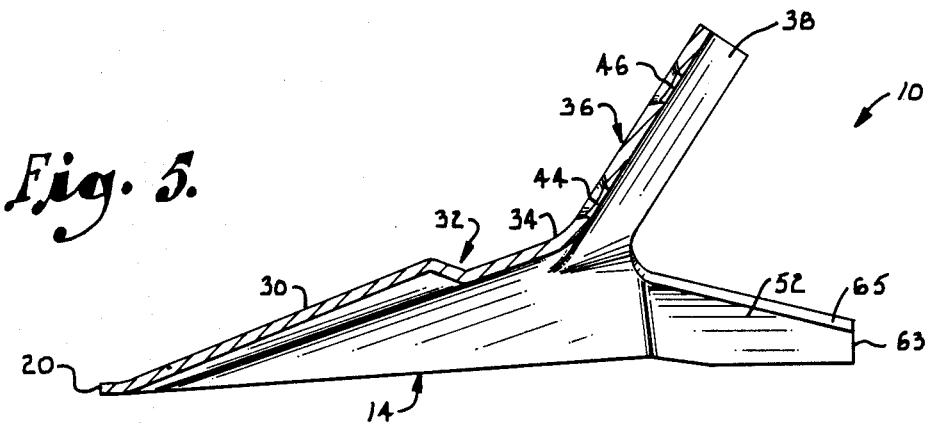
FIG. 5 is a vertical, cross-sectional view of the sweep taken substantially along line 5—5 of FIG. 2.

The mounting bracket 36 is angularly disposed for attaching the sweep 10 to the supporting shank 12 of the implement in such a manner that the head 14 and the side edges 16,18 are tilted slightly downwardly and forwardly during movement through the soil as the implement is advanced (see FIGS. 3 and 5, for example). Each of the inclined surfaces 58,60 of the flaps 52,54 terminates laterally outwardly in a lowermost slip edge 62,64 which extends rearwardly from the intersection of the corresponding side edges 16,18 of the head 14 with the breakline 56. The slip edges 62,64 are disposed such that when the sweep 10 is attached to the shank 12 of the implement, the slip edges 62,64 will be substantially horizontal. The flaps 52,54 slope inwardly upward at a 21° angle from the slip edges when edges 62,64 are horizontally disposed. The flaps 52,54 have transverse rearmost trailing edges 63 disposed at generally right angles to the line of symmetry 24 of head 14 and diagonally inwardly and forwardly extending inside edges 65 which are substantially parallel to the side edges 16 and 18 of head 14.

OPERATION

In use, when the sweep 10 is attached to the shank 12 of the farm implement, the inclined attitude of the bracket 36 causes the head 14 to be tilted slightly downwardly and forwardly during movement through the soil as the implement is advanced. This tilted positon of the head 14 and its side edges 16,18 is illustrated in FIG. 3 which shows the sweep 10 and a horizontal reference line 66. In actual use, the head 14 and flaps 52,54 are underneath the surface of the ground as the sweep 10 is worked through the ground.

As the head 14 encounters unworked soil, the soil is penetrated by the forwardmost point 20 and lifted by the faces 26,28. Roots encountered by the side cutting edges 16,18 are severed cleanly, allowing the aboveground plants to fall in place on the top surface of the ground. The ridge 30 helps to divide the soil into portions on each side of head 14 which are then lifted by the faces 26,28 until the soil passes over the transverse breakline 56.

Once the rear extremity 22 of the head 14 passes under the lifted soil, the trailing flaps 52,54 come into position under the lifted soil. However, due to the particular angular attitude of their downwardly and outwardly inclined surfaces 58 and 60, which are disposed such that all points on the flaps 52,54 are no higher than corresponding, forwardly aligned points on the transverse breakline 56, the flaps have no additional rolling or turning action on the soil and tend to slip effortlessly through the cuts made by the head portion of the sweep. Thus, the soil loosened and lifted by the head 14 is encouraged to lay back down after root cutting, with only a minimum of disturbance to the top surface of the ground.

Figure 2:
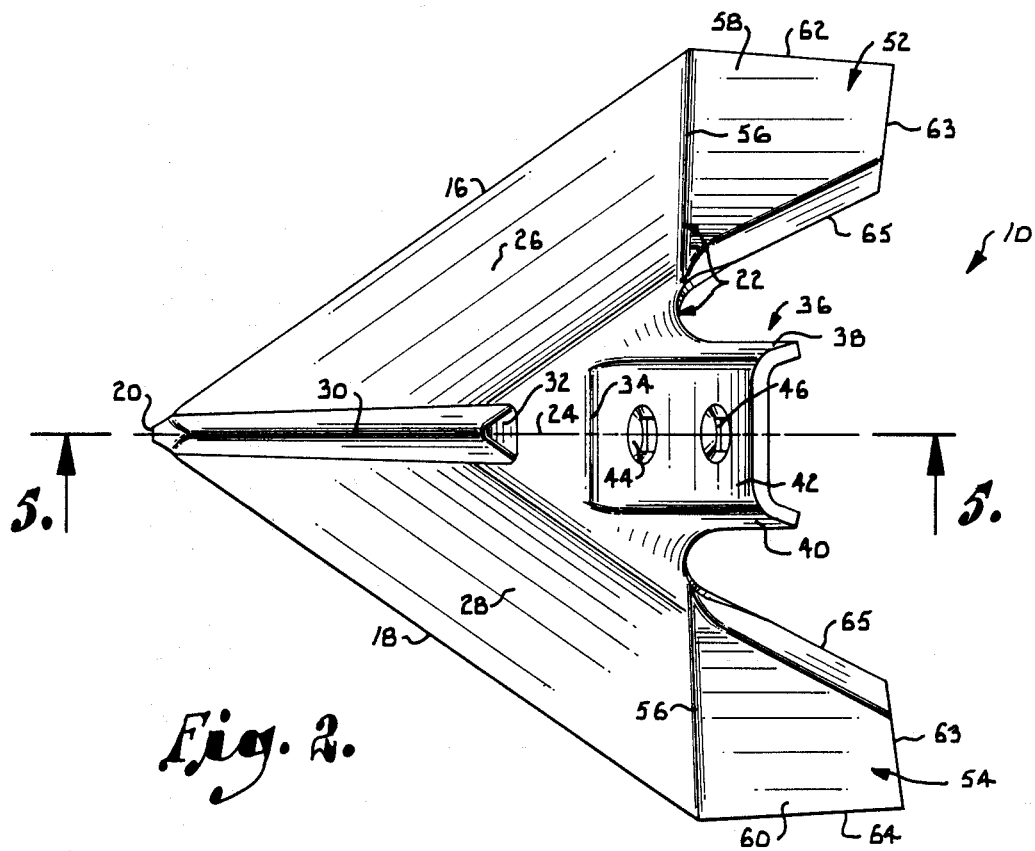
FIG. 2 is a top plan view of the sweep.

Furthermore, it will be noted that, contrary to many prior sweeps, the sweep of the present invention avoids a sharp corner at the rear, outermost extremities of the triangular head 14, which sharp corner, if present, would be subject to premature wear and reduction of the effective operating width of the sweep. In place of such corners, the sweep of the present invention continues further rearwardly at those critical locations, presenting the rearwardly extending slip edges 62,64 which intersect with the front cutting edges 16 and 18 at an obtuse angle when viewed in top plan, as shown in FIG. 2. As also shown in FIG. 2, the rearwardly extending slip edges 62,64 extend generally parallel to the fore-and-aft line of symmetry of the head. Consequently, instead of a vunerable, sharp point or corner, the sweep 10 presents a substantial amount of additional metal surface area to resist wear.

Still further, the special flaps 52 and 54 have the effect of strengthening, stiffening, and reinforcing the sweep along its rear extremity to resist undue flexure of the sweep and the problems which attend such action. Consequently, it should be apparent from the foregoing that the sweep of the present invention provides a significant improvement upon sweeps heretofore available and provides solutions to problems which have heretofore been of considerable concern in this art.

We claim:

1. A cultivator sweep for use on a ground working tillage implement comprising:

a generally triangular head having a pair of opposite side edges diverging rearwardly from a forwardmost point and a rear extremity extending transversely between said side edges, said head being provided with a central line of symmetry extending rearwardly from said point and with a pair of opposite, inclined, generally triangular faces extending downwardly and outwardly in opposite directions from said line of symmetry to said side edges;

a centrally located mounting bracket integral with and projecting upwardly from the rear extremity of the head for attaching the sweep to supporting structure on said implement; and a pair of laterally spaced apart, rigid flaps on opposite sides of said bracket integral with and extending rearwardly from said rear extremity of the head, said rear extremity of the head comprising a transverse break line at which the faces of the head intersect with the flaps, said flaps being downturned at said break line relative to said faces and having respective uppermost, downwardly and outwardly inclined surfaces so disposed that all points on said flaps are no higher than corresponding, forwardly aligned in plan points on the transverse break line, said inclined surfaces of the flaps terminating laterally outwardly in lowermost outer edges extending generally parallel to the line of symmetry of the head and intersecting at an obtuse angle with said side edges of the head when viewed in plan.

2. A cultivator sweep as claimed in claim 1, said mounting bracket being disposed for attaching the sweep to the support of the implement in such a manner that the head and said side edges thereof are tilted slightly downwardly and forwardly during movement through the soil as the implement is advanced, each of said outer edges of the flaps extending generally horizontally when the head and its side edges are tilted slightly downwardly and forwardly.

3. In a cultivator sweep as claimed in claim 2, each of said flaps having a rearmost, trailing edge extending tranversely inwardly form the corresponding outer edge of the flap at generally right angles to the line of symmetry of the head.

4. A cultivator sweep as claimed in claim 1, said bracket having lower, forward portions thereof intersecting the head forwardly of said transverse break line.

5. A cultivator sweep as claimed in claim 1, each of said flaps having a rearmost, trailing edge extending transversely inwardly from the corresponding outer edge of the flap at generally right angles to the line of symmetry of the head.

6. A cultivator sweep for use on a ground working tillage implement comprising:

a generally triangular head having a pair of opposite side edges diverging rearwardly from a forwardmost point and a rear extremity extending transversely between said side edges, said head being provided with a central line of symmetry extending rearwardly from said point and with a pair of opposite, inclined, generally triangular faces extending downwardly and outwardly in opposite directions from said line of symmetry to said side edges;

a centrally located mounting bracket integral with and projecting upwardly from the rear extremity of the head for attaching the sweep to supporting structure on said implement; and a pair of laterally spaced apart, rigid flaps on opposite sides of said bracket integral with and extending rearwardly from said rear extremity of the head, said rear extremity of the head comprising a transverse break line at which the faces of the head intersect with the flaps, said flaps being downturned at said break line relative to said faces and having respective uppermost, downwardly and outwardly inclined surfaces so disposed that all points on said flaps are no higher than corresponding, forwardly aligned points on the transverse break line, said mounting bracket being disposed for attaching the sweep to the support of the implement in such a manner that the head and said side edges thereof are tilted slightly downwardly and forwardly during movement through the soil as the implement is advanced, each of said inclined surfaces of the flaps terminating laterally outwardly in a lowermost, horizontal, outer edge extending rearwardly from the intersection of the corresponding side edge of the head with said break line, each of said flaps having a rearmost, trailing edge extending transversely inwardly from the corresponding outer edge of the flap at generally right angles to the line of symmetry of the head, said trailing edges of the flaps terminating at locations spaced outwardly from said line of symmetry of the head, each of said flaps being further provided with an inner edge intersecting the corresponding trailing edge and extending diagonally forwardly therefrom in at least generally parallelism with the corresponding said edges of the head.

* * * * *